United States Patent
Gao et al.

(10) Patent No.: US 9,842,047 B2
(45) Date of Patent: Dec. 12, 2017

(54) NON-SEQUENTIAL WRITE FOR SEQUENTIAL READ BACK

(71) Applicant: Seagate Technology LLC, Cupertino, CA (US)

(72) Inventors: Kaizhong Gao, North Oaks, MN (US); Wenzhong Zhu, Apple Valley, MN (US); Tim Rausch, Farmington, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 335 days.

(21) Appl. No.: 14/688,515

(22) Filed: Apr. 16, 2015

(65) Prior Publication Data

US 2016/0147650 A1   May 26, 2016

Related U.S. Application Data

(60) Provisional application No. 62/108,929, filed on Jan. 28, 2015, provisional application No. 62/083,696, filed on Nov. 24, 2015, provisional application No. 62/083,732, filed on Nov. 24, 2014.

(51) Int. Cl.
 *G06F 12/02* (2006.01)
 *G11B 20/12* (2006.01)
 *G11B 5/012* (2006.01)

(52) U.S. Cl.
 CPC ...... *G06F 12/0238* (2013.01); *G11B 20/1217* (2013.01); *G06F 2212/1044* (2013.01); *G06F 2212/152* (2013.01); *G06F 2212/21* (2013.01); *G06F 2212/70* (2013.01); *G11B 5/012* (2013.01); *G11B 2020/1238* (2013.01); *G11B 2020/1267* (2013.01); *G11B 2020/1292* (2013.01)

(58) Field of Classification Search
 None
 See application file for complete search history.

(56) References Cited

U.S. PATENT DOCUMENTS

| | | | |
|---|---|---|---|
| 4,030,130 A | 6/1977 | Smith |
| 4,152,736 A | 5/1979 | Jansen et al. |
| 4,298,897 A | 11/1981 | Arter et al. |
| 4,535,372 A | 8/1985 | Yeakley |
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A | 2/1989 | Fujioka et al. |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — Midys Rojas
(74) *Attorney, Agent, or Firm* — Holzer Patel Drennan

(57) ABSTRACT

A storage device controller addresses consecutively-addressed portions of incoming data to consecutive data tracks on a storage medium and writes the consecutively-addressed portions to the consecutive data tracks in a non-consecutive track order. In one implementation, the storage device controller reads the data back from the consecutive data tracks in a consecutive address order in a single sequential read operation.

20 Claims, 5 Drawing Sheets

(56) References Cited

U.S. PATENT DOCUMENTS

| | | |
|---|---|---|
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B1 | 3/2009 | Okamoto et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,139,318 B2 | 3/2012 | Biskeborn |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 | 9/2015 | Edelman et al. |
| 9,142,246 B1 | 9/2015 | Trantham et al. |
| 9,153,287 B1 | 10/2015 | Hamilton et al. |
| 9,324,362 B1 | 4/2016 | Gao et al. |
| 9,396,062 B1 | 7/2016 | Sridhara et al. |
| 9,418,688 B1 | 8/2016 | Rausch et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2012/0221797 A1* | 8/2012 | Chung ............... G06F 12/0846 711/131 |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0089757 A1* | 3/2014 | Yang ............... H03M 13/112 714/752 |
| 2014/0153134 A1 | 6/2014 | Han et al. |
| 2014/0160589 A1 | 6/2014 | Deki et al. |
| 2014/0285923 A1 | 9/2014 | Aoki |
| 2014/0327983 A1 | 11/2014 | Biskeborn et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | 02240862 A | 9/1990 |
| WO | 2005-030869 A1 | 4/2005 |

* cited by examiner

NON-SEQUENTIAL WRITE FOR SEQUENTIAL READ BACK

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014, and also to U.S. Provisional Patent Application No. 62/108,929, entitled "Non-Sequential Write for Sequential Read Back" and filed on Jan. 28, 2015. All of these applications are specifically incorporated by reference for all that they disclose or teach.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

Better designs are desired to increase ADC beyond that provided by CMR and SMR systems.

BRIEF DESCRIPTIONS OF THE DRAWINGS

SUMMARY

Implementations disclosed herein provide a storage device controller configured to receive data addressed to a consecutive sequence of logical block addresses (LBAs) corresponding to a consecutive sequence of data tracks on a storage medium and to write the data to the consecutive sequence of data tracks in a non-consecutive track order.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
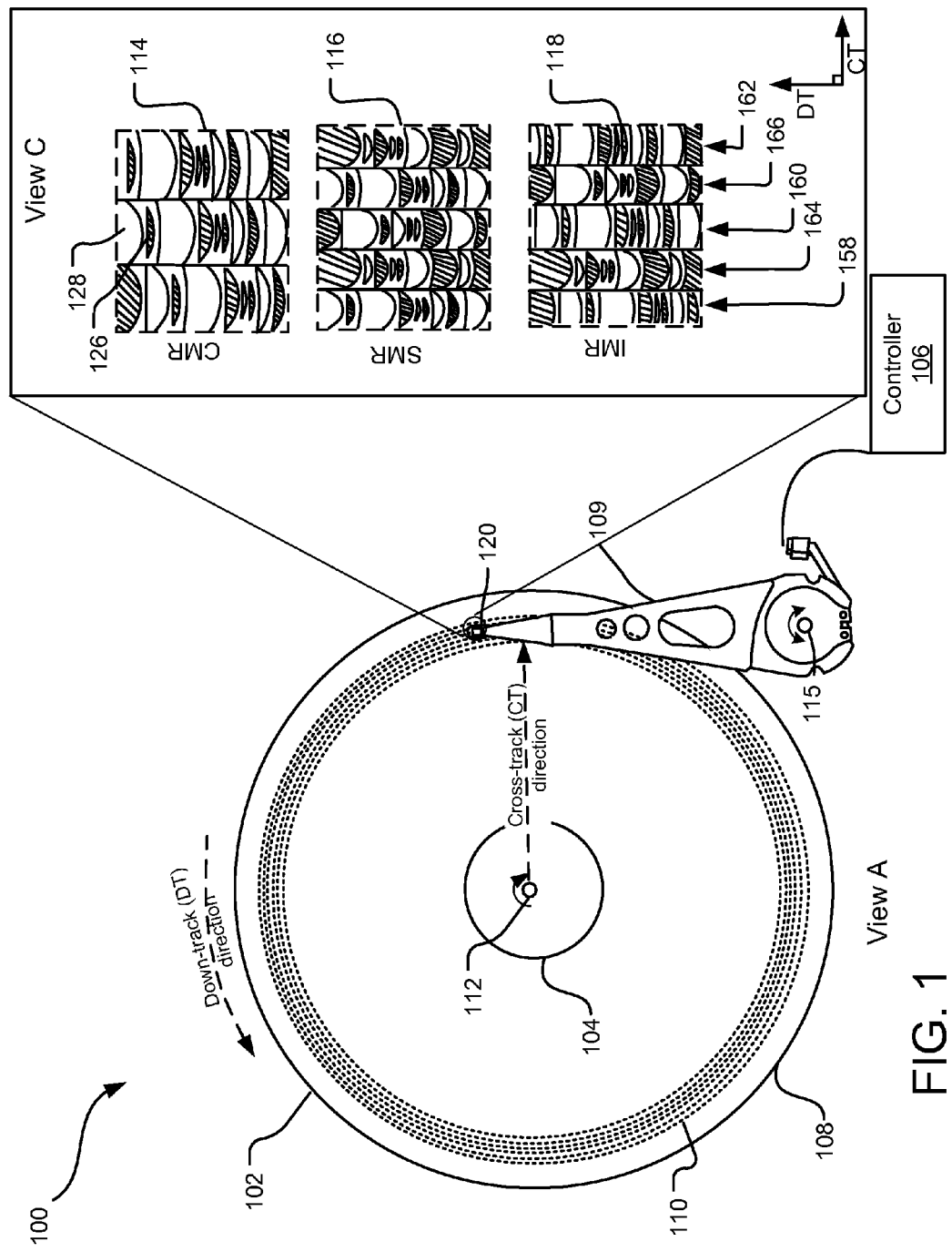
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 115. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

The transducer head assembly 120 includes at least one write element (not shown) including a write pole for converting a series of electrical pulses sent from a controller 106 into a series of magnetic pulses of commensurate magnitude and length. The magnetic pulses of the write pole selectively magnetize magnetic grains of the rotating magnetic media 108 as they pass below the pulsating write element.

View C illustrates magnified views 114, 116, and 118 of a same surface portion of the storage media 108 according to different write methodologies and settings of the data storage device 100. Specifically, the magnified views 114, 116, and 118 include a number of magnetically polarized regions, also referred to herein as "data bits," along the data tracks of the storage media 108. Each of the data bits (e.g., a data bit 128) represents one or more individual data bits of a same state (e.g., is or Os). For example, the data bit 128 is a magnetically polarized region representing multiple bits of a first state (e.g., "000"), while an adjacent data bit 126 is an oppositely polarized region representing one or more bits of a second state (e.g., a single "1"). The data bits in each of the magnified views 114, 116, and 118 are not necessarily illustrative of the actual shapes or separations of the bits within an individual system configuration.

The magnified view 114 illustrates magnetic transitions recorded according to a conventional magnetic recording (CMR) technique. Under CMR, all written data tracks are randomly writeable and have substantially equal written track width. "Written track width" refers to, for example, a width measured in a cross-track direction of a recorded data bit. Each of the individual data tracks is randomly writeable, but a maximum attainable ADC is reduced as compared to the shingled and interlaced magnetic recording technique described below.

As used herein, a data track is randomly writeable when the data track can be individually re-written multiple times without significantly degrading data on other adjacent data tracks. An adjacent data track is "significantly degraded" if reading the data track results in a number of read errors in excess of a maximum number of errors that can be corrected by an error correction code (ECC) of the data 100 storage device.

The magnified view 116 illustrates magnetic transitions recorded according to a shingled magnetic recording (SMR) technique. Under SMR, consecutive data tracks are written to sequentially with a write element that affects two data tracks at once. Data is written to the magnetic medium 108 in units of "data bands" where each data band includes a series of consecutive data tracks and is separated from adjacent data band(s) by one or more "guard tracks" where no data is stored. Under SMR, no data tracks are randomly writeable, but a resulting ADC is increased as compared to a maximum ADC attainable when the above-described CMR technique is employed.

The magnified view 118 illustrates magnetic transitions recorded according to an interlaced magnetic recording (IMR) technique. IMR utilizes alternating data tracks of different written track widths arranged with slightly overlapping edges so that a center-to-center distance between directly adjacent tracks (e.g., the track pitch) is uniform across the surface of the magnetic medium 108.

For example, the IMR technique shown in the magnified view 118 illustrates alternating data tracks of two different written track widths. A first series of alternating tracks (e.g., tracks 158, 160, and 162) have a wider written track width than a second series of interlaced data tracks (e.g., 164 and 166). Each wide data track of the first series (e.g., the data track 160) is written before the narrow and directly adjacent data tracks of the second series (e.g., the data tracks 164 and 166). For example, the data track 160 is written before the data tracks 164 and 165. The write to data tracks 164 and 166 overwrites outer edge portions of the data track 160; however, the data track 160 is still readable.

Because each data track of wide written width is written prior to directly adjacent data tracks of narrower width, the data tracks of the wider written width (e.g., data tracks 158, 160, and 162) are also referred to herein as "bottom tracks," while the alternating data tracks of narrower written width (e.g., the data tracks 164 and 166) are referred to herein as "top tracks." According to one implementation, the top tracks are of a lower linear density (e.g., kilo bytes per inch, measured in the down-track direction) than the bottom tracks. Other IMR implementations utilize interlaced data tracks having more than two different linear densities and/or written track widths.

By manipulating the linear densities of the top and bottom data tracks and also manipulating an order in which the data tracks are written, IMR systems can be tuned to exhibit a number of characteristics superior to CMR and SMR systems.

In one implementation, the IMR technique illustrated in magnified view 118 provides for system performance that is better than the best performing SMR systems. If, for example, the linear density of the top data tracks is selected to be lower than an experimentally-defined threshold, then each of the top data tracks is randomly writeable. Since random writes cannot be performed in SMR systems, an IMR system that provides for random writes exhibits superior performance characteristics as compared to SMR systems.

In another implementation, the IMR technique illustrated in magnified view 118 provides for an ADC of the magnetic medium 108 that significantly exceeds the maximum attainable ADC in SMR systems. If, for example, the linear densities of the top and bottom data tracks are pushed to upper limits (e.g., beyond that of systems described above), the data tracks may cease to be randomly writeable but provide for a very high total ADC. For example, a linear density of the top data track 166 may be selected so that the top data track 166 can be written exactly once without significantly degrading data of the adjacent (e.g., previously-written) bottom data tracks 160 and 162. Many of the implementations described herein elaborate on this type of IMR system that provides a very high ADC by pushing linear densities of the top data tracks and bottom data tracks to upper limits.

In one implementation, portions of incoming data addressed to a sequence of consecutive logical block addresses (LBAs) are written to a series of consecutive data tracks (e.g., the data tracks 158, 164, 160, 166, and 162). Consequently, the data may be read back from the consecutive data tracks in order of the consecutive LBA sequence without lifting the actuator arm 109 to perform a seek operation. This type of read operation is referred to herein as a "sequential read." Notably, the nature of IMR does not allow for sequential writes (e.g., writing to consecutive data tracks in a consecutive order) without significantly degrading one or more of the data tracks. In one implementation, the technology disclosed herein provides for sequential reads of stored data by directing incoming data addressed to a consecutive sequence of LBAs to a series of consecutive data tracks in a non-consecutive track order.

Figure 2:
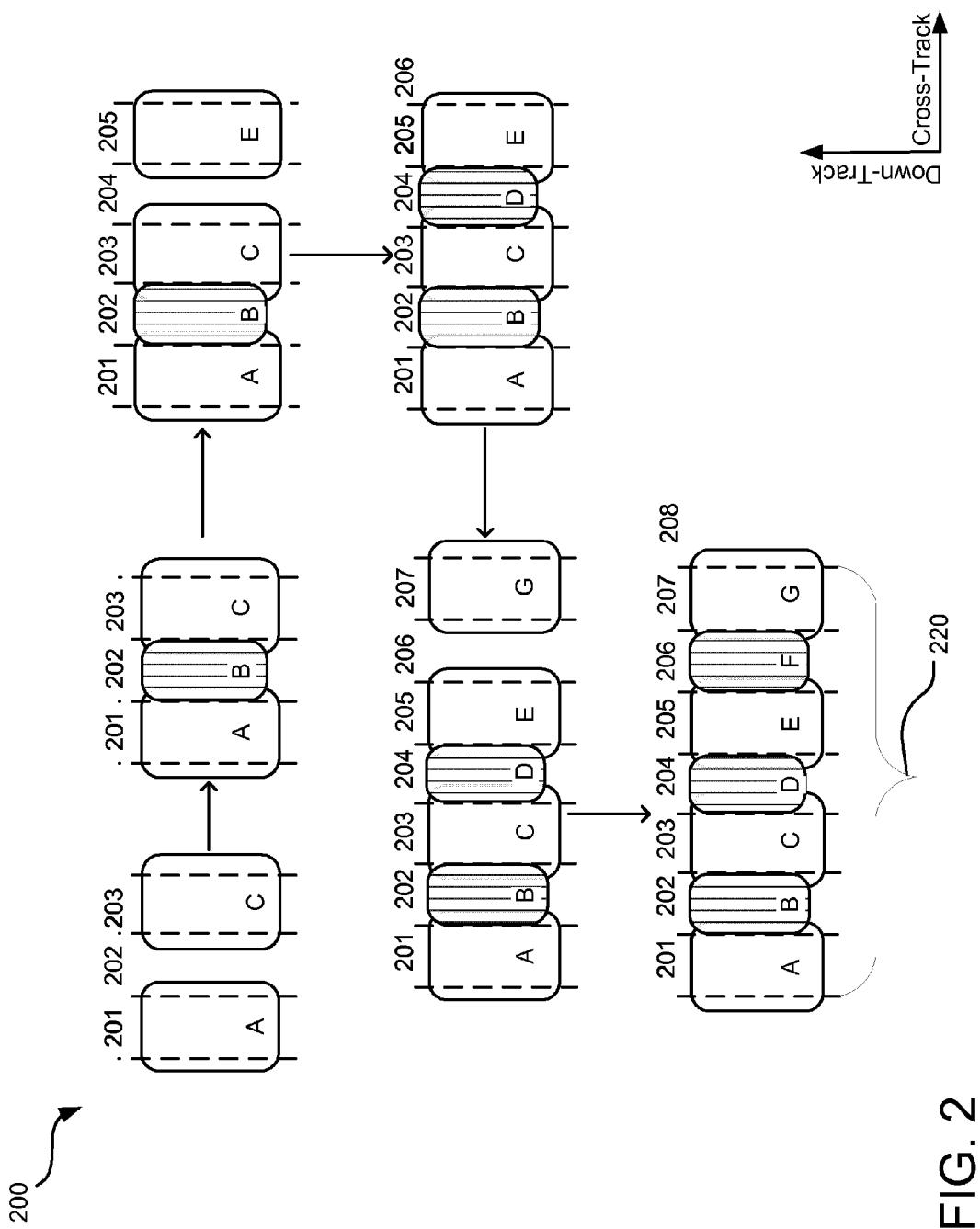
FIG. 2 illustrates data writes in an interlaced magnetic recording (IMR) system employing an example non-sequential write scheme for sequential data read back.

FIG. 2 illustrates data writes to a magnetic disc in an IMR system employing an example non-sequential write scheme 200 for sequential data read back. A storage device controller receives data addressed to a consecutive sequence of LBAs corresponding to a consecutive sequence of data tracks (201-207) on the magnetic disc and writes the data to the consecutive sequence of data tracks in a non-consecutive track order.

In FIG. 2, the data addressed to the consecutive sequence of LBAs is annotated with the letters A-G, where alphabetical order indicates a sequential LBA order. In at least one implementation, the data addressed to the consecutive sequence of LBAs is a file with the data portions sequentially ordered A-G, from beginning to end.

In the following description, the terms "first portion", "second portion", "third portion", etc. refer to portions of the data addressed to various consecutive LBAs. If, for example, data is addressed to LBAs 0-299, a "first portion of the data" may refer to LBAs 0-99; a "second portion of the data" may refer to LBAs 100-199; and a "third portion of the data" may refer to LBAs 200-299. In FIG. 2, the letters A-G represent portions of the data addressed to consecutive LBA sequences. For example, the letter 'A' may refer to data addressed to LBAs 0-99; the letter 'B' may refer to data addressed to LBAs 100-199; the letter 'C' may refer to data addressed to LBAs 200-299, etc.

In writing the data to the magnetic disc, the storage device controller first writes the first and third portions of the data (A and C) to alternating data tracks 201 and 203 separated by an interlaced data track 202 (e.g., a blank data track). After writing portions A and C, the storage device controller writes a second portion (B) to the interlaced data track 202.

Then, in chronological order, the storage device controller writes a fifth portion of the data (E) to a data track 205; a fourth portion of the data (D) to a data track 204, a seventh portion of the data (G) to a data track 207, and a sixth portion of the data (F) to a data track 206.

To summarize the above-described write scheme: if a most-recently written data track is referred to as index N, the next data track written has an index of N+2 if the data track of index N−1 already stores data. However, if the data track of index N−1 is blank and does not already store data, the data track of index N−1 is written next immediately following the write to the data track of index N. This trend continues so long as some portion of the data remains to be written to the magnetic disc.

After all portions of the data are written to the magnetic disc, the series of consecutive data tracks 201-207 stores the consecutive portions of the data, A-G, in a consecutive order. To read the data back from the data tracks 201-207 in the consecutive LBA order, the storage device controller can perform a sequential read of the data tracks 201-207.

As shown in FIG. 2, the odd-numbered data tracks (e.g., 201, 203, 205, 207, etc.) are bottom data tracks having a larger written track width than the top, even-numbered data tracks (e.g., 202, 204, 206, etc.). Each of the top data tracks is written after a data write to the immediately adjacent bottom data tracks. For example, the data track 204 is not written to until after data is written to the immediately adjacent data tracks 203 and 205. Each of the top data tracks (e.g., 204) overlaps and overwrites edge data of the immediately adjacent bottom data tracks (e.g., 203, 205).

In one implementation, two different linear densities are employed to write the data to the magnetic disc. Data stored in the bottom data tracks is written at a first linear density that is higher than the linear density of data stored in the top data tracks. In one implementation, linear densities selected for use in the top and bottom data tracks are low enough that the top data tracks are randomly writeable.

In another implementation, the linear densities of the top and bottom data tracks are selected to be so high that individual tracks within the series (e.g., data tracks 201-207) are not randomly writeable. For example, a linear density of the data track 204 is so high that the data portion D cannot be re-written to the data track 204 without significantly degrading data on the immediately adjacent data tracks 203 and 205. In this case, individual tracks of the data tracks 201-207 cannot be updated without re-writing each of the other data tracks. For example, updating data of the portion D may entail writing the following portions in the following order: re-writing portion A to track 201; re-writing portion C to track 203; re-writing portion B to track 202, re-writing portion E to track 205; updating data of the portion D in track 204; re-writing portion G to track 207; and re-writing portion F to track 206.

Maximizing linear densities (as described above) can provide for a large increase in total ADC as compared to implementations where each individual data track has a low enough linear density and can be written to at random. However, the use of very high linear densities implicates a write scheme under which groupings of data tracks (e.g., two or more adjacent data tracks) are treated as individual write units.

For example, the data tracks 201-207 may represent a high-density data band 220 that is re-written in its entirety each time any data track within the high-density data band 220 is updated. The high-density data band 220 may be used to store a single file (as described above), or multiple files. Different high-density data bands on the magnetic disc can be of uniform or variable size.

In one implementation, each high-density data band on the magnetic disc is separated by an adjacent high-density data band by one or more low-density data tracks. For example, the data track 208 may be a low-density data track that stores data at a lower linear density than any of the data tracks within the high-density data band 220. Each of the low-density data tracks is randomly writeable and thus can be updated without updating or re-writing data of any other data track on the magnetic disc.

Designated low-density data tracks, such as a data track 208, can be used to separate adjacent high-density data bands. In one simplistic implementation, low-density data tracks separating high-density data bands are left blank until such a time that the magnetic disc becomes so full that user data cannot be directed elsewhere. In another implementation, one or more of the low-density data tracks store a portion of a file including other data stored in one of the high-density data bands. In yet another implementation, the low-density data tracks are used to store infrequently accessed data, such as system data or infrequently accessed user data.

Figure 3:
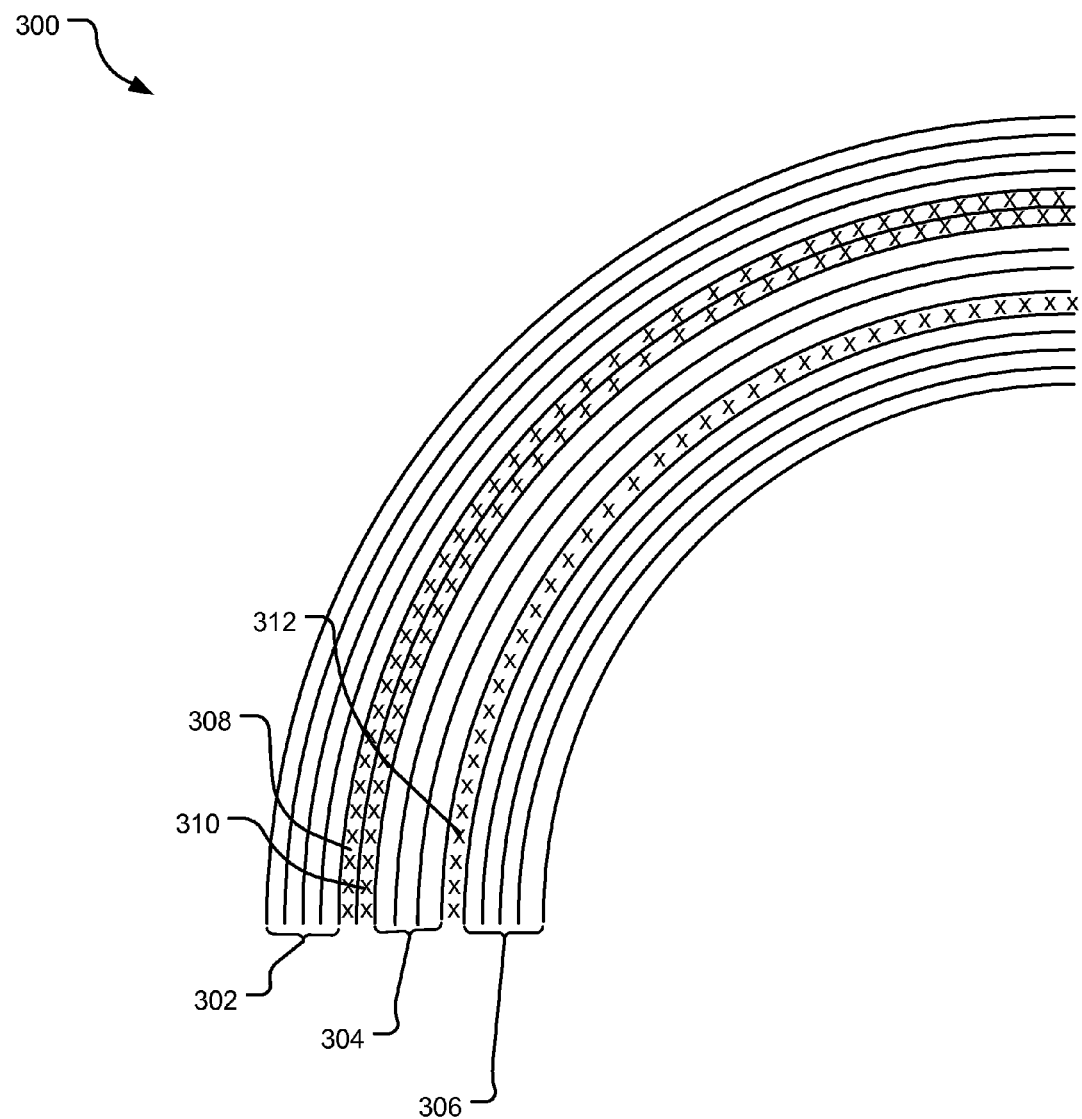
FIG. 3 illustrates a magnetic disc including a number of high-density data bands each separated from one another by one or more low-density data tracks.

FIG. 3 illustrates a magnetic disc 300 including a number of high-density data bands (e.g., high density data bands 302, 304, 306) each separated from one another by one or more low-density data tracks (e.g., low-density data tracks 308, 310, and 312). Each of the high-density data bands 302, 304, and 306 includes multiple data tracks updated as a single write unit. For example, updating data in a single data track within the high density data band 304 may entail reading all other data tracks in the high density data band 304 to a temporary memory location and then re-writing the entire band to include the updated data in the affected data track.

In one implementation, each of the high density data bands 302, 304, or 306 includes data corresponding to (e.g., originally addressed to) a consecutive LBA sequence spanning the data tracks of the associated data band so as to allow for a sequential read of the data from the magnetic disc 300 according to the consecutive LBA sequence.

To record the data on the magnetic disc 300, a storage device controller writes to data tracks of a high-density data band in a non-consecutive track order. In one implementation, the high density data bands store data according to an IMR technique where alternating data tracks have varying written track width and/or linear densities.

Each of the low density data tracks (e.g., 308, 310, and 312) are randomly writeable and store data at a lower linear density than the data tracks in any of the high density data bands. A written track width of the low density data tracks may be the same or different from one another and one or more data tracks located in a high density data band.

Figure 4:
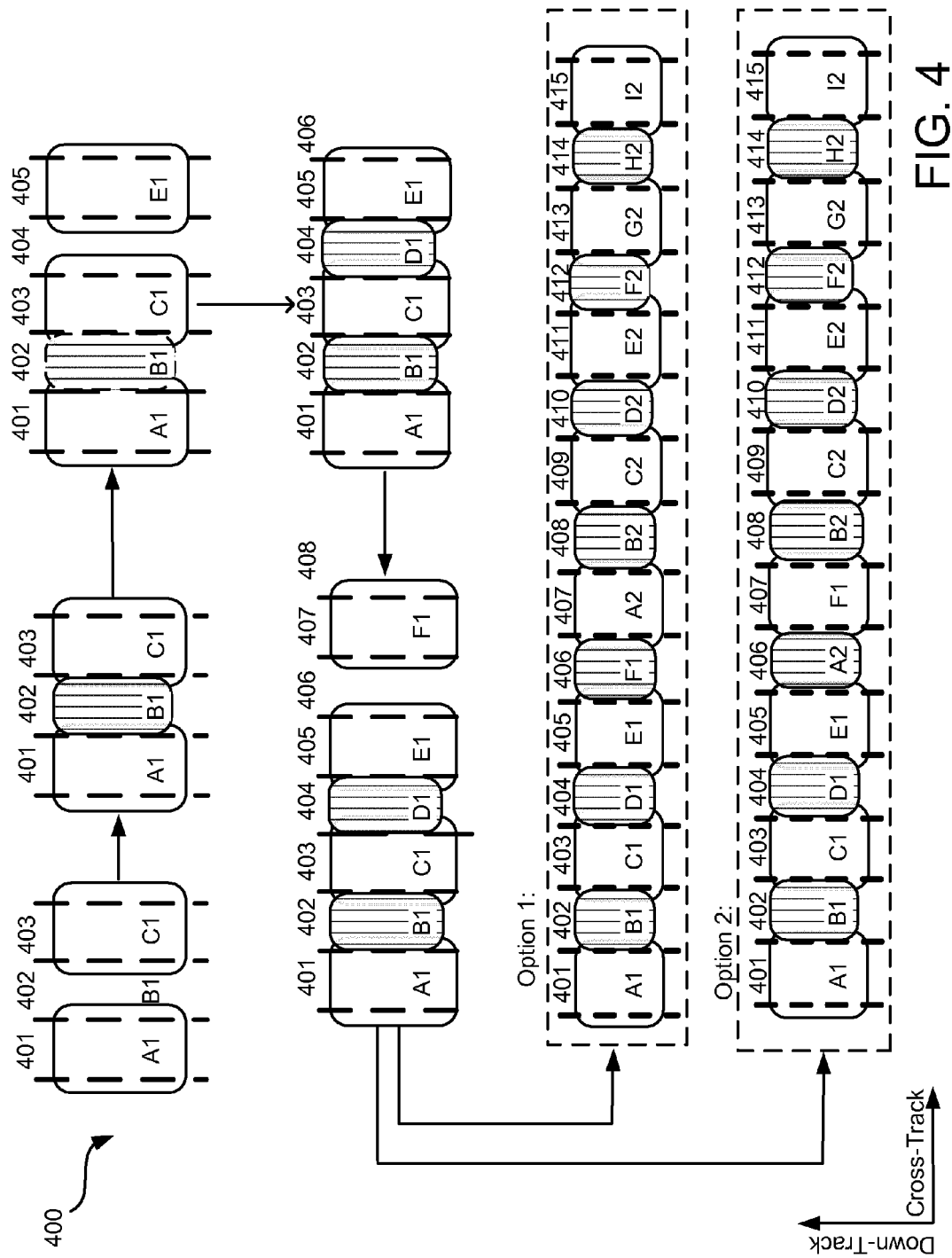
FIG. 4 illustrates additional example writes in an IMR system employing an example non-sequential write scheme for sequential file read back.

FIG. 4 illustrates example writes in an IMR system employing an example non-sequential write scheme 400 for sequential file read back. In one implementation, the write scheme is used to write a file to a high-density data band of IMR data. The example writes 400 illustrate options for writing portions of a first file (e.g., A1-F1) and a second file (e.g., A2-I2) to data tracks located within a same high-density data band. In FIG. 4, consecutive file portions are annotated by alphabetically arranged letters indicating a sequential ordering of the file from beginning to end.

In writing a first file to the high-density data band, a storage device controller initially writes first and third portions of the first file (A1 and C1) to alternating data tracks 401 and 404 separated by a blank, interlaced data track 402, followed by a second portion (B1) of the first file to the interlaced data track 402. Then, in chronological order, the storage device controller writes a fifth portion of the first file (E1) to a data track 405; a fourth portion of the first file (D1) to a data track 404, and a sixth (e.g., a final) portion of the first file (F1) to a data track 407. Notably, the sixth and final portion (F1) of the first file is separated from the remaining portions of the file by a blank data track 406. Thus, so long as the data tracks 406 and 408 do not include any data, the sixth portion (F1) is randomly writeable to the data track 407.

Once the storage device controller receives and stores the data of the first file (e.g., A1-F1, as shown), the controller follows one of two possible addressing schemes to address and store portions of the second file to the same high-density data band. Under a first option, (option 1), the storage device controller moves the sixth portion (F1) of the first file from the data track 407 to the adjacent data track 406 so that all consecutive portions (A1-F1) of the first file are stored in consecutive data tracks 401-406. Thereafter, the storage device controller addresses consecutive portions (A2-I2) of the second file to consecutive data tracks 407 through 415. The consecutive portions A2-I2 are written to the data tracks 407 through 415 according to the following non-consecutive track order: portion A2 to 407, portion C2 to 409, portion B2 to 408, portion E2 to 411, portion D2 to 410, portion G2 to 413, portion F2 to 412, portion I2 to 415, and portion H2 414.

Under Option 2, the storage device controller allows the first portion (A2) of the second file to be interlaced between the two final portions (E1 and F1) of the first file. The last portion (F1) of the first file is not (e.g., as in option 1) moved from the data track 407 to 406 prior to writing the portions (A2-I2) of the second file. Rather, the storage device controller addresses the first portion (A2) of the second file to the data track 406 so that it is separated from other portions of the second file by the data track 407, which stores the sixth portion (F1) of the first file.

Remaining portions of the second file are written to the high density data band using a write methodology similar to that described above. For example, portions of the second file are written according to the following non-consecutive track order: portion A2 to 405, portion C2 to 409, portion B2 to 408, portion E2 to 411, portion D2 to 410, portion G2 to 413, portion F2 to 412, portion I2 to 415, and portion H2 to 414.

Figure 5:
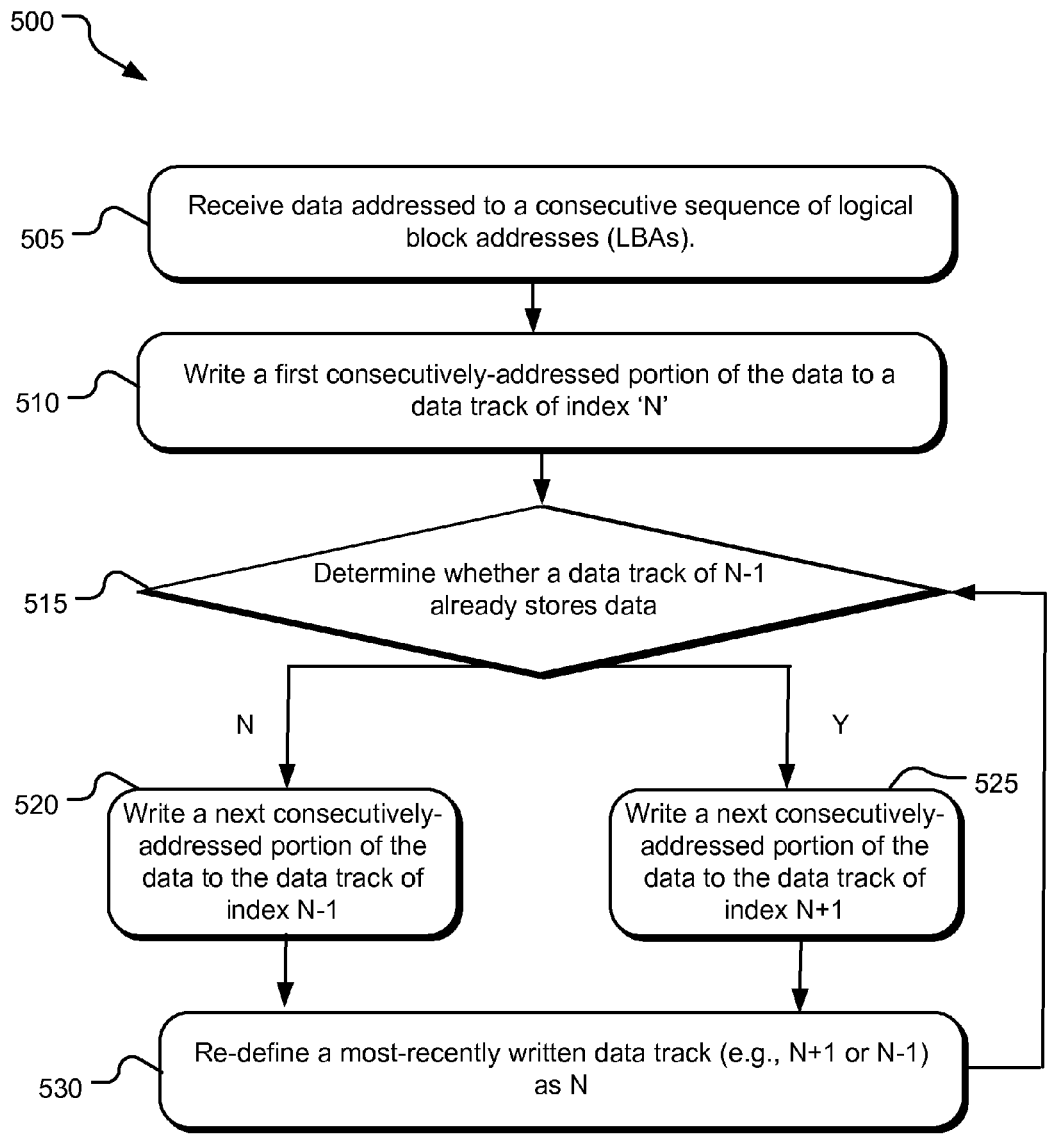
FIG. 5 illustrates example operations for performing a non-sequential data write that provides for sequential data read back in an IMR system.

FIG. 5 illustrates example operations 500 for performing a non-sequential data write that provides for sequential LBA and/or file read back in an IMR system. A receiving operation 505 receives data addressed to a consecutive sequence of LBAs. In one implementation, the consecutive data tracks are included in a high-density data band generally written to as a single write unit and separated from an adjacent high-density data band on the disc by one or more randomly writeable data tracks storing data at a lower linear density.

A first writing operation 510 writes a first consecutively-addressed portion (e.g., a portion 1) of the data to a corresponding data track having an index N. A determination operation 515 then determines whether a data track of index N−1 already stored data of the file. If the data track of index N−1 does not already store data, a writing operation 520 writes a next consecutively-addressed portion (e.g., a portion 2) of the data to the data track of index N−1. If, however, the data track N−1 does already store data, another writing operation 525 writes the next consecutively-addressed portion (e.g., the portion 2) to the data track of index N+1. A re-defining operation 530 re-defines a most recently written data track (e.g., N−1 or N+1) as "N", and the operations 515 and 520 or 525 repeat until the entire data file is written to the magnetic disc.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
receiving data addressed to a consecutive sequence of logical block addresses (LBAs) corresponding to a consecutive sequence of data tracks on a storage medium; and
writing the data to the consecutive sequence of data tracks in a non-consecutive track order.

2. The method of claim 1, further comprising:
writing the data addressed to a first consecutive portion of the consecutive sequence of LBAs to a data track of index N;
writing the data addressed to a second consecutive portion of the consecutive sequence of LBAs to a data track of index N+2; and
writing the data addressed to a third consecutive portion of the consecutive sequence of LBAs to a data track of index N+1.

3. The method of claim 1, further comprising:
reading the data stored in the consecutive sequence of data tracks in a single sequential read operation.

4. The method of claim 1, wherein the data is a file and the method further comprises:
writing data addressed to a last portion of the file to an interlaced data track positioned between two blank data tracks.

5. The method of claim 4, wherein the data is a file and the method further comprises:
writing portions of another file to the two blank data tracks.

6. The method of claim 4, wherein the data is a file and the method further comprises:
moving the data of the last portion of the file to one of the two blank data tracks prior to writing data in another one of the two blank data tracks.

7. The method of claim 1, wherein at least two adjacent tracks of the consecutive data tracks have different written track widths.

8. The method of claim 1, wherein the consecutive data tracks include alternating data tracks storing data at alternating linear densities.

9. A storage device controller configured to:
write data addressed to a consecutive sequence of LBAs to a series of consecutive data tracks on a storage medium in a non-consecutive track order; and
read the data from the consecutive data tracks in a single sequential read operation.

10. The storage device controller of claim 9, wherein writing the data further comprises:
writing data to a first data track and subsequently writing data to a second data track separated from the first data track by one interlaced data track;
writing data to the interlaced data track after writing data to the first data track and the second data track.

11. The storage device controller of claim 9, wherein the consecutive data tracks include at least two adjacent tracks have different written track widths.

12. The storage device controller of claim 9, wherein the consecutive data tracks include alternating data tracks storing data at alternating linear densities.

13. Apparatus comprising:
a storage device controller configured receive data addressed to a consecutive sequence of logical block addresses (LBAs) corresponding to a consecutive sequence of data tracks on a storage medium and write the data to the consecutive sequence of data tracks in a non-consecutive track order.

14. The apparatus claim 13, wherein the storage device is further configured to:
write the data addressed to a first consecutive portion of the consecutive sequence of LBAs to a data track of index N;
write the data addressed to a second consecutive portion of the consecutive sequence of LBAs to a data track of index N+2 if a data track of index N−1 already stores data; and
if the data track of index N−1 does not already store data, write the data addressed to the second consecutive portion of the consecutive sequence of LBAs to a data track of index N−1.

15. The apparatus of claim 13, wherein the storage device is further configured to:
read the data stored in the consecutive sequence of data tracks in a single sequential read operation.

16. The apparatus of claim 13, wherein the data is a file and the storage device is further configured to:
write data addressed to a last portion of the file to an interlaced data track directly adjacent to two blank data tracks.

17. The apparatus of claim 16, wherein the storage device is further configured to write
a first consecutive portion of another file to the two blank data tracks directly adjacent to the interlaced data track.

18. The apparatus of claim 16, wherein the storage device is further configured to move the data of the last portion of the file to one of the two blank data tracks prior to writing data in another one of the two blank data tracks.

19. The apparatus of claim 13, wherein the consecutive data tracks include at least two adjacent tracks having different written track widths.

20. The apparatus of claim 13, wherein the consecutive data tracks form a portion of a high density data band are separated from an adjacent high density data band by at least one low density data track.

* * * * *